United States Patent
Fujiwara

(10) Patent No.: US 9,948,821 B2
(45) Date of Patent: Apr. 17, 2018

(54) NON-TRANSITORY COMPUTER-READABLE RECORDING MEDIUM STORING COMPUTER-READABLE INSTRUCTIONS FOR CAUSING INFORMATION PROCESSING DEVICE TO EXECUTE COMMUNICATION PROCESSING WITH PUSH NOTIFICATION SERVER AND PRINTER

(71) Applicant: Brother Kogyo Kabushiki Kaisha, Nagoya-shi, Aichi-ken (JP)

(72) Inventor: Susumu Fujiwara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/279,553

(22) Filed: Sep. 29, 2016

(65) Prior Publication Data
US 2017/0094104 A1   Mar. 30, 2017

(30) Foreign Application Priority Data

Sep. 30, 2015   (JP) .................. 2015-193148

(51) Int. Cl.
| | |
|---|---|
| H04N 1/32 | (2006.01) |
| G06F 3/12 | (2006.01) |
| H04N 1/00 | (2006.01) |

(52) U.S. Cl.
CPC ....... *H04N 1/32609* (2013.01); *G06F 3/1204* (2013.01); *G06F 3/126* (2013.01); *G06F 3/1236* (2013.01); *G06F 3/1288* (2013.01); *G06F 3/1292* (2013.01); *H04N 1/00106* (2013.01); *H04N 1/00228* (2013.01); *H04N 1/00307* (2013.01); *H04N 1/32101* (2013.01); *H04N 2201/006* (2013.01); *H04N 2201/0039* (2013.01)

(58) Field of Classification Search
CPC .................................................. H04N 1/32609
See application file for complete search history.

(56) References Cited

U.S. PATENT DOCUMENTS

| | | | | |
|---|---|---|---|---|
| 6,529,692 B1 * | 3/2003 | Haines | ................. | B41J 2/17566 399/27 |
| 8,095,172 B1 * | 1/2012 | Cole | .................... | H04W 48/18 370/254 |
| 2006/0092464 A1 * | 5/2006 | Ataka | ................... | G06F 3/1204 358/1.15 |

(Continued)

FOREIGN PATENT DOCUMENTS

JP   2015-028792 A   2/2015

*Primary Examiner* — Ibrahim Siddo
(74) *Attorney, Agent, or Firm* — Banner & Witcoff, Ltd.

(57) ABSTRACT

An information processing device may accept an input of a first print instruction. The information processing device may send first print data to a printer in response to accepting the input of the first print instruction. The information processing device may store second print data in the memory in a print stand-by state. The information processing device may receive a push notification from the push notification server. The push notification may include first information that is related to first print processing using the first print data and outputted from the printer. The information processing device may send the second print data to the printer in response to receiving the first information.

20 Claims, 10 Drawing Sheets

(56) References Cited

U.S. PATENT DOCUMENTS

| | | | |
|---|---|---|---|
| 2009/0027716 A1* | 1/2009 | Kuhn | G06K 15/02 358/1.15 |
| 2009/0165012 A1* | 6/2009 | Corona | G06F 9/5044 718/105 |
| 2011/0134465 A1* | 6/2011 | Gha | G06F 3/1221 358/1.15 |
| 2012/0250059 A1* | 10/2012 | Itogawa | G06F 3/1204 358/1.13 |
| 2014/0036309 A1* | 2/2014 | Oguma | G06F 3/12 358/1.15 |
| 2014/0368865 A1* | 12/2014 | Gutnik | G06F 3/1222 358/1.15 |

\* cited by examiner

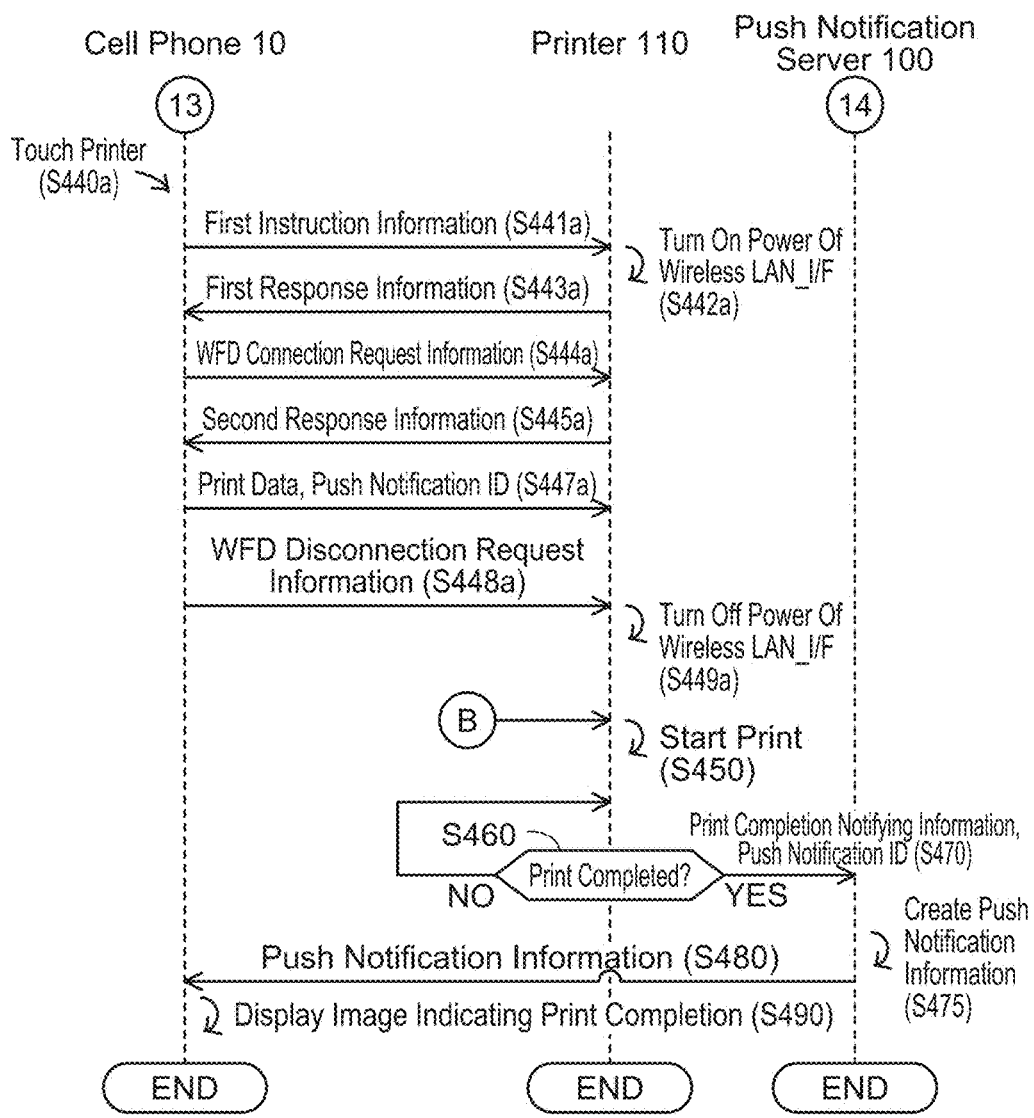

NON-TRANSITORY COMPUTER-READABLE RECORDING MEDIUM STORING COMPUTER-READABLE INSTRUCTIONS FOR CAUSING INFORMATION PROCESSING DEVICE TO EXECUTE COMMUNICATION PROCESSING WITH PUSH NOTIFICATION SERVER AND PRINTER

CROSS-REFERENCE TO RELATED APPLICATION

This application claims priority to Japanese Patent Application No. 2015-193148, filed on Sep. 30, 2015, the contents of which are hereby incorporated by reference into the present application.

TECHNICAL FIELD

The technique disclosed in this description relates to a technique for executing print processing in a printer by using an information processing device is provided.

DESCRIPTION OF RELATED ART

A print control program for controlling print processing in a printer using an information processing device such as a portable terminal is known. When the A print control program is executed in the information processing device, print data can be sent from the information processing device to the printer. Further, the print processing using the print data can be executed in the printer.

SUMMARY

In a case of printing a large amount of print data, or in a case where the print processing is to be carried out in succession, the print data may be queued in the information processing device. In the present description, a new configuration for sending the queued print data to the printer in response to having received information indicating that print processing has been finished in the printer from the server.

One technique disclosed in the present application is a non-transitory computer-readable recording medium storing computer-readable instructions for an information processing device. The information processing device may comprise a memory and a communication interface configured to communicate with a push notification server and a printer. The computer-readable instructions, when executed by a controller of the information processing device, may cause the information processing device to perform accepting an input of a first print instruction. The computer-readable instructions may cause the information processing device to perform sending first print data to the printer through the communication interface in response to accepting the input of the first print instruction. The computer-readable instructions may cause the information processing device to perform storing second print data in the memory in a print stand-by state. The computer-readable instructions may cause the information processing device to perform receiving a push notification from the push notification server. The push notification may include first information that is related to first print processing using the first print data and outputted from the printer. The computer-readable instructions may cause the information processing device to perform sending the second print data, which had been stored in the storing, to the printer through the communication interface in response to receiving the first information.

BRIEF DESCRIPTION OF THE DRAWINGS

FIG. 11 shows a sequence diagram of the communication system of the second embodiment.

EMBODIMENTS

First Embodiment

Figure 1:
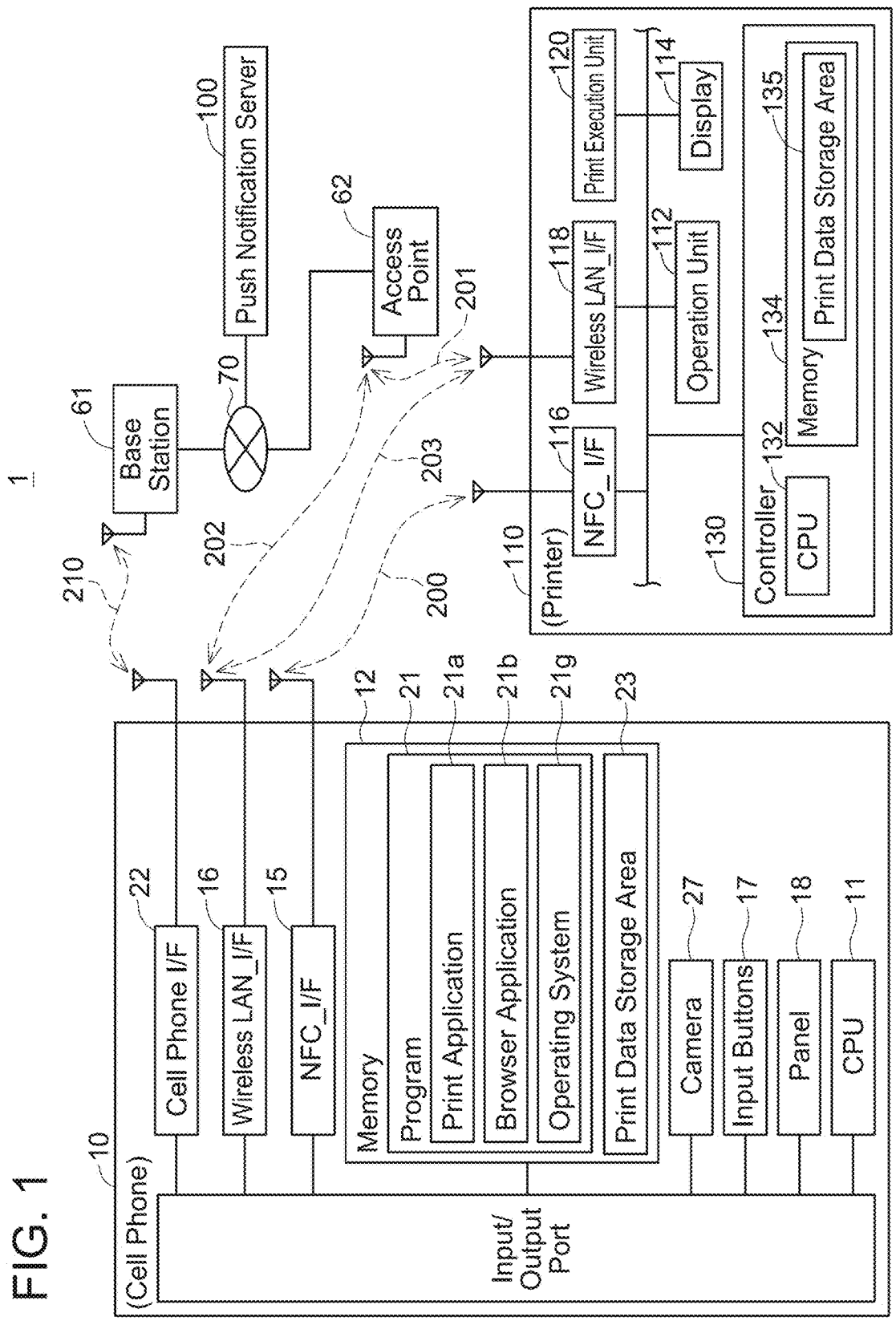
FIG. 1 shows a configuration of a communication system.

FIG. 1 shows a block diagram of a communication system 1 exemplified as an embodiment of the present application. The communication system 1 includes a cell phone 10, a printer 110, an access point 62, a push notification server 100, and a base station 61. The access point 62 is a well-known relay device. The push notification server 100 can communicate with the cell phone 10 through the Internet 70 and the base station 61. Further, the push notification server 100 can communicate with the printer 110 and the cell phone 10 through the Internet 70 and the access point 62.

The cell phone 10 is a cell phone mounted with the Android (registered trademark of Google Inc.) or the iOS (registered trademark of Cisco Systems, Inc.). The cell phone 10 primarily includes a CPU 11, a memory 12, an NFC interface 15, a wireless LAN interface 16, input buttons 17, a panel 18, a cell phone interface 22, and a camera 27. The CPU 11 controls various functions according to programs stored in the memory 12 and various signals sent and received through the wireless LAN_I/F 16. Further, the CPU 11 serves as respective units for the functions by reading the programs. In this description the interface may be denoted as "I/F".

The NFC_I/F 15 is an I/F for executing a wireless communication 200 (hereinbelow referred to as "NFC communication 200") according to an NFC standards for a so-called near field wireless communication. That is, the NFC_I/F 15 is an IC chip, or a communication circuit therefor. The NFC standards is a wireless communication standards based on International Standards such as ISO/IEC 21481 or 18092. The cell phone I/F 22 performs a wireless communication 210 with the base station 61. The wireless communication 210 may be a wireless communication under a cellular standards such as 3G or 4G.

The wireless LAN_I/F 16 is an I/F for executing a wireless communication (hereinbelow referred to as "Wi-Fi communication") according to a wireless communication according to a Wi-Fi standards defined by the Wi-Fi Alliance. That is, the wireless LAN_I/F 16 is an IC chip, or a communication circuit therefor. The wireless LAN_I/F 16 can communicate with a wireless LAN_I/F 118 of the printer 110 through wireless communications 201 and 202 in an infrastructure mode. Further, the wireless LAN_I/F 16 can directly communicate with the wireless LAN_I/F 118 of the printer 110 through a WFD communication 203 in a Wi-Fi Direct (hereinbelow denoted as WFD) standards. That is, the cell phone 10 can create a WFD network by establishing the connection with the printer 110 according to the WFD standards. In the WFD, the wireless communication based on the standard 802.11 of the IEEE or the standards according thereto (for example, 802.11a, 11b, 11g, 11n, etc.) is executed.

The input buttons 17 are keys for executing the respective functions of the cell phone 10. The input buttons 17 may be configured integrally to the panel 18 as a touch panel. The panel 18 displays respective function information of the cell phone 10.

The memory 12 includes programs 21 and a print data storage area 23. The print data storage area 23 is an area where print data to be sent to the printer 110 is queued. Notably, the memory 12 may be configured by combining a RAM, a ROM, a flash memory, an HDD, and an SD card (registered trademark of SD Association), and the like. The memory 12 may be a computer-readable storage medium. The computer-readable storage medium is a non-transitory medium such as a ROM, a RAM, a flash memory, or a hard disk. Electric signals that convey programs downloaded from a server on the Internet or the like are not included in the non-transitory medium.

The programs 21 include a print application 21*a*, a browser application 21*b*, and an operating system 21*g* (hereinbelow denoted as OS 21*g*). The OS 21*g* is a program that controls an entirety of the cell phone 10.

The print application 21*a* is an application for the printer 110 to execute printing. The print application 21*a* is an application supplied by a vendor of the printer 110. The print application 21*a* may be installed in the cell phone 10 from a server not shown on the Internet, or may be installed in the cell phone 10 from a media shipped with the printer 110. The browser application 21*b* is an application for displaying web data acquired from the server not shown on the Internet on the panel 18.

The printer 110 is a peripheral equipment that can execute a print function. That is, the printer 110 is a peripheral equipment of a PC or the like. The printer 110 includes an operation unit 112, a display 114, an NFC interface 116, the wireless LAN interface 118, a print execution unit 120, and a controller 130. The respective units 112 to 130 are connected by a bus line (a reference sign not given).

The operation unit 112 includes a plurality of keys. A user can give the printer 110 various instructions by operating the operation unit 112. The display 114 is a display for displaying various type of information. The print execution unit 120 is a print mechanism such as an ink jet technology, a laser technology, and the like. Configurations of the NFC_I/F 116 and wireless LAN_I/F 118 are similar to the configurations of the aforementioned NFC_I/F 15 and wireless LAN_I/F 16, thus the descriptions thereof will herein be omitted.

The controller 130 includes a CPU 132 and a memory 134. The CPU 132 is a controller that executes various processes according to programs (not shown) stored in the memory 134. The memory 134 is configured of a RAM, a ROM, and the like. The memory 134 may be a computer-readable storage medium, similar to the memory 12. The memory 134 includes a print data storage area 135. The print data storage area 135 is an area where the print data to be printed in the print execution unit 120 is queued.

The push notification server 100 is a server provided on the Internet 70. The push notification server 100 is a server that provides a push notification service. The push notification service is a service that allows the cell phone 10 to receive push notification information containing various messages sent from the server not shown on the Internet 70. The push notification information allows the cell phone 10 to receive the push notification information even under a state where the relevant application is not activated in the cell phone 10. The cell phone 10 can display various notification images based on the received push notification information on the panel 18. An example of the notification images includes an image showing a notice of a new e-mail or an update of an application. An example of a framework for providing the push notification service includes an APNS (referred to as Apple Push Notification Service), or a GCM (referred to as Google Cloud Messaging for Android). The push notification is also called a remote notification, and it is notified from devices other than the device on which the application operates. The remote notification is created in the push notification server 100 when there is a message to be displayed or data to be downloaded is present, and is distributed to the operating system of the device. When receiving it, the operating system notifies the user of the application on the device. The user notification includes, other than the remote notification, a local notification. This notification is given to the user of the same device by the application scheduling it itself and processing the data as needed. The push notification server 100 may be a general server. Thus, the description of contents of the specific configurations provided in the push notification server 100 will be omitted herein.

Notes on the Description in this Specification

In the ensuing explanation, the CPU 11 to execute programs such as an application and the operating system 21*g* is sometimes simply referred to by the program name. For example, the indication of "print application 21*a*" may mean "the CPU 11 that executes the print application 21*a*". In this specification, the description "the CPU 11 of the cell phone 10 receives various types of information" includes a technical content that "the CPU 11 of the cell phone 10 receives the various types of information through the cell phone I/F 22, the wireless LAN_I/F 16, and the NFC_I/F 15". Further, the description "the CPU 11 of the cell phone 10 sends various types of information" includes a technical content that "the CPU 11 of the cell phone 10 outputs the various types of information through the cell phone I/F 22, the wireless LAN_I/F 16, and the NFC_I/F 15".

Here, a definition of the terms "data" and "information" will be explained. In the present specification, "information" is used as a concept superordinate to "data". Consequently, "data A" may be rephrased as "information A". Further, even in a case where the "information" has a different format as "data" (e.g., text format, binary format, flag format, etc.), this is treated as the same information as long as it is recognized that the meaning is the same. For example, as long as the device treats data as information indicating that the number of print copies is two parts, data of the text format "COPY=2", and data of the binary format "10" are the same information. However, the aforementioned distinction between "information" and "data" is not rigid, and exceptions to the rule are also allowed.

(Operation of Communication System)

An operation of the communication system 1 of the first embodiment will be described with reference to sequence diagrams of FIGS. 2 to 4. In S100, the CPU 11 of the cell phone 10 receives an input of an activation instruction of the print application 21*a*. For example, the input of the activation instruction may be received according to a touch input to an activation icon of the print application 21*a* displayed on the panel 18.

In S110, the CPU 11 activates the print application 21*a*. Due to this, a display screen for the print application 21*a* is displayed on a foreground of the panel 18. Further, in a case where the CPU 11 is executing another application (for example, the browser application 21*b*), a display screen for the other application is hidden in a background. Due to this, the print application 21*a* comes to be in an active state where it can receive inputs by the user. The print application 21*a* being in the active state can also be said as being a state in which the print application 21*a* is being executed with priority over the other application.

In S120, the print application 21*a* receives a selection operation of a print target file. The print target file is a data file indicating an image to be printed in the printer 110. The print target file may include print data for a plurality of pages. In the present embodiment, an explanation will be given hereinbelow of a case where the print target file includes print data for N pages (N being an integer of 2 or more).

In S130, the print application 21*a* sends acquisition request information for a push notification ID to the push notification server 100. The push notification ID is identification information that is used to identify an external device to which the push notification server 100 should send the push notification information. Notably, various types of data and information are sent and received between the cell phone 10 and the push notification server 100 through the wireless communication 202 and the Internet 70. The same applies to the respective steps to be described later.

In S140, the print application 21*a* receives the push notification ID from the push notification server 100. Further, the print application 21*a* temporarily stores the received push notification ID in the memory 12.

In S150, the user inputs first print instruction to the cell phone 10. For example, the first print instruction may be inputted by touching a button image of "print" included in the display screen for the print application 21*a*. In S160, the print application 21*a* receives the input of the first print instruction.

In S170, the print application 21*a* establishes a Wi-Fi communication of an infrastructure mode between the cell phone 10 and the printer 110. That is, the cell phone 10 and the printer 110 are wirelessly connected by the wireless communications 201 and 202.

In S180, the print application 21*a* sends the print data for one page and the push notification ID to the printer 110. Notably, various types of data and information are sent and received between the cell phone 10 and the printer 110 by the wireless communications 201 and 202 that are executed between the wireless LAN_I/F 16 and the wireless LAN_I/F 118. The same applies to the respective steps to be described later.

In S190, the CPU 132 of the printer 110 determines whether or not the received print data for one page can be stored in the print data storage area 135. In a case where a capacity of the print data storage area 135 is running short, a negative determination is made in S190, and the process proceeds to S200. In S200, the CPU 132 sends back 'Busy' information to the cell phone 10. The 'Busy' information is information for notifying the print application 21*a* that the received print data for one page is larger than the available capacity of the print data storage area 135.

On the other hand, in a case where an affirmative determination is made in S190 (S190: YES), the process proceeds to S210. In S210, the CPU 132 determines whether or not all of the print data for N pages included in the print target file have been received. In a case where an affirmative determination is made (S210: YES), the process proceeds to S222. In S222, the CPU 132 sends back receipt completion information to the cell phone 10. The receipt completion information is information for notifying the cell phone 10 that all of the print data for N pages have been received. On the other hand, in a case where a negative determination is made in S210 (S210: NO), the process proceeds to S220. In S220, the CPU 132 sends back print data request information to the cell phone 10. The print data request information is information for requesting the print application 21*a* to send print data for a next page to the printer 110.

In S230, the print application 21*a* determines the information sent back from the printer 110. In a case where the sent-back information is the receipt completion information (S230: receipt completion information), the process proceeds to S300. On the other hand, in a case where the sent-back information is the print data request information (S230: print data request information), the process returns to S180. Then, the print data for the next page included in the print target file and the push notification ID are sent to the push notification server 100. On the other hand, in a case where the sent-back information is 'Busy' information (S230: 'Busy' information), the process proceeds to S240.

In S240, the print application 21*a* divides print data for pages that have not yet been sent and included in the print target file. Then the print application 21*a* stores the divided print data in the print data storage area 23. Specifically, in a case where the print data of an M-th page of the print target file (where M is an integer of 1 or more and smaller than N) is sent in S180 and the 'Busy' information is received as the reply, the print data for (N−M+1) pages from M-th page to N-th page is divided, and is stored in the print data storage area 23.

In S245, the print application 21*a* sends queue completion notifying information to the printer 110. The queue completion notifying information is information for notifying the printer 110 that the divided print data has been queued in the print data storage area 23.

In S300, the print application 21*a* determines whether or not an input of a second print instruction has been received during a print processing period. The print processing period is a period from when the print application 21*a* had sent the print data to the printer 110 (S180) until when it receives push notification information (to be described later) from the push notification server 100 (S340). Contents of the second print instruction are the same as those of the first print instruction explained in S150, thus the description thereof will be omitted herein. In a case where a negative determination is made (S300: NO), the process proceeds to S320, and in a case where an affirmative determination is made (S300: YES), the process proceeds to S310.

In S310, the print application 21*a* stores the print data of which printing was instructed by the second print instruction in the print data storage area 23. That is, the print data of which printing was instructed by the second print instruction is queued in the print data storage area 23. Then, the process proceeds to S320.

In S320, the CPU 11 of the cell phone 10 determines whether or not an input of an activation instruction of an application other than the print application 21a has been received. An example of this other application is the browser application 21b. In a case where a negative determination is made (S320: NO), S325 is skipped, and in a case where an affirmative determination is made (S320: YES), the process proceeds to S325. In S325, the CPU 11 activates the other application. Then, the other application is brought to an active state by displaying a screen of the other application on the foreground of the panel 18. Further, the CPU 11 brings the print application 21a to an inactive state by hiding the screen of the print application 21a in the background of the panel 18.

An operation of the printer 110 will be described. When the queue completion notifying information sent from the cell phone 10 in S245 is received, the CPU 32 of the printer 110 causes the print execution unit 120 to execute a first print processing in S250. The first print processing is a process executed by using the print data sent in S180.

In S260, the CPU 132 determines whether or not an error occurred during the execution of the first print processing. Examples of this error may be running out of ink, running out of paper, paper jam, and the like. In a case where a negative determination is made (S260: NO), the process proceeds to S280, and in a case where an affirmative determination is made (S260: YES), the process proceeds to S270.

In S270, the CPU 132 sends error notifying information and the push notification ID received in S180 to the push notification server 100. The error notifying information is information indicating that some sort of print error occurred during the execution of the first print processing in the printer 110. Notably, various types of data and information are sent and received between the printer 110 and the push notification server 100 through the wireless communication 201 and the Internet 70. The same applies to the respective steps to be described later.

In S280, the CPU 132 determines whether or not the first print processing is completed. In a case where a negative determination is made (S280: NO), the process returns to S260, and in a case where an affirmative determination is made (S280: YES), the process proceeds to S290. In S290, the CPU 132 sends print completion notifying information and the push notification ID received in S180 to the push notification server 100. The print completion notifying information is information indicating that the first print processing in the printer 110 has been completed.

When the push notification server 100 receives the error notifying information sent from the printer 110 in S270 or the print completion notifying information sent from the printer 110 in S290, the push notification server 100 generates push notification information in S330. The push notification information is information that is sent by a push notification service and including various messages. Further, the push notification information includes one of the error notifying information or the print completion notifying information. In S340, the push notification server 100 sends the generated push notification information to an external device identified by the push notification ID received in S270 or S290. Due to this, the push notification information is sent to the cell phone 10.

The print application 21a of the cell phone 10 receives the push notification information sent from the push notification server 100. In S350, the print application 21a determines the received push notification information. In a case of determining that the error notifying information is included in the push notification information, a determination is made that in this case an error had occurred in the first print processing (S250) executed in the printer 110, and the process proceeds to S360.

Figure 5:
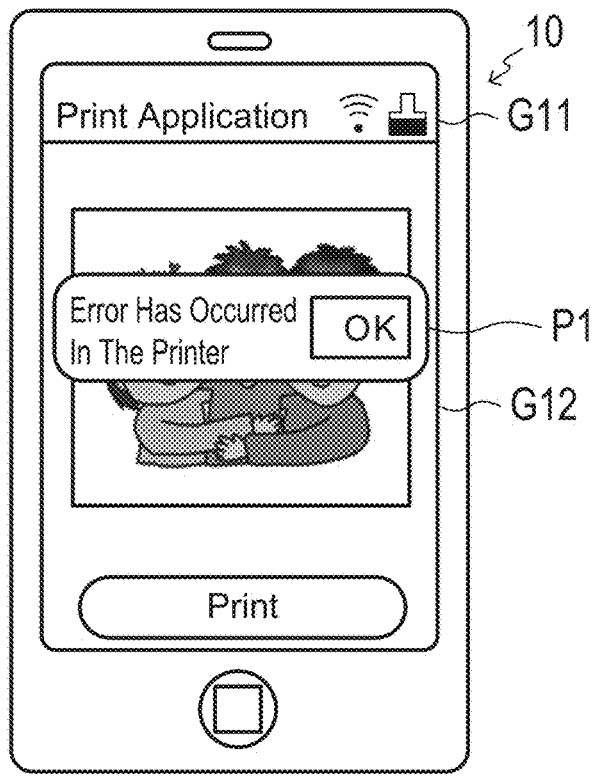
FIG. 5 shows an example of a notification screen and a display screen.

In S360, the print application 21a displays a notification image P1 indicating that the error had occurred in the first print processing on the panel 18. FIG. 5 shows a notification screen G11 and a display screen G12 displayed on the panel 18 in S360. The notification screen G11 is a screen for indicating icon images indicating various notifications such as a radio wave intensity, a remaining battery indicator, and the like. The display screen G12 is a screen for displaying execution screens of various applications. The display screen G12 has a larger area size than the notification screen G11. As shown in FIG. 5, the display screen G12 includes a pop-up notification image P1.

On the other hand, in S350, in a case of determining that the push notification information includes the print completion notifying information, a determination is made that in this case the first print processing is completed, and the process proceeds to S370. In S370, the print application 21a determines whether or not the print data is stored in the print data storage area 23. That is, a determination is made as to whether or not the print data was queued in S240 or S310 as aforementioned. In a case where a negative determination is made (S370: NO), the process proceeds to S375, and the print application 21a displays an image indicating that the first print processing is completed on the panel 18. Then, the flow is terminated. The image may be displayed in a pop-up as aforementioned, or may be displayed in an icon.

On the other hand, in a case where an affirmative determination is made in S370 (S370: YES), the process proceeds to S380. In S380, the print application 21a determines whether or not the print application 21a is in the active state. Specifically, a determination is made on which of the foreground or the background the display screen of the print application 21a is displayed. In a case where the display screen of the print application 21a is displayed on the foreground, a determination is made that the print application 21a is in the active state (S380: YES), and the process proceeds to S390.

Figure 6:
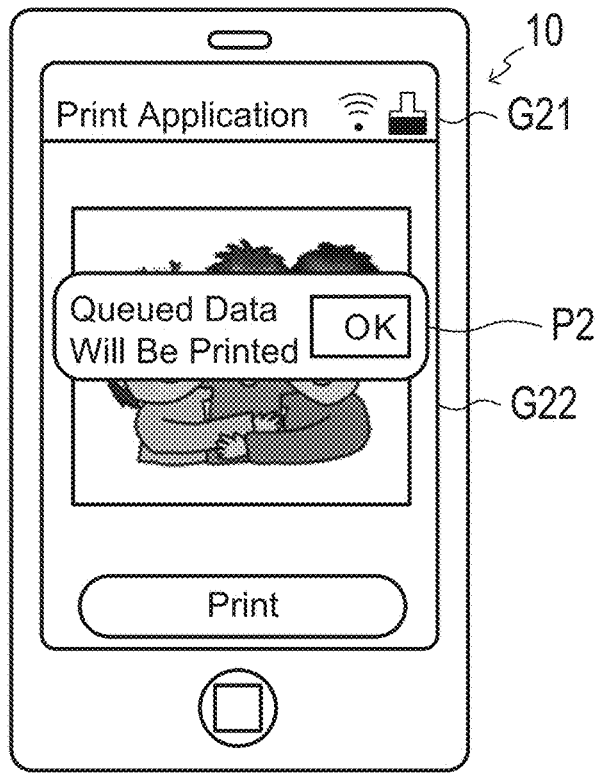
FIG. 6 shows an example of the notification screen and the display screen.

In S390, the print application 21a displays a notification image P2 on the panel 18. The notification image P2 is an image for notifying the user that the print data queued in the print data storage area 23 is to be sent to the printer 110. FIG. 6 shows examples of the notification screen G21 and the display screen G22 displayed on the panel 18 in S390. As shown in FIG. 6, the display screen G22 includes a pop-up notification image P2.

On the other hand, in a case where the display screen of the print application 21a is hidden in the background, a determination is made that the print application 21a is not in the active state (S380: NO), and the process proceeds to S400. As an example of the case where the negative determination is made in S380, a case where the input of the activation instruction for the other application was received in S320.

Figure 7:
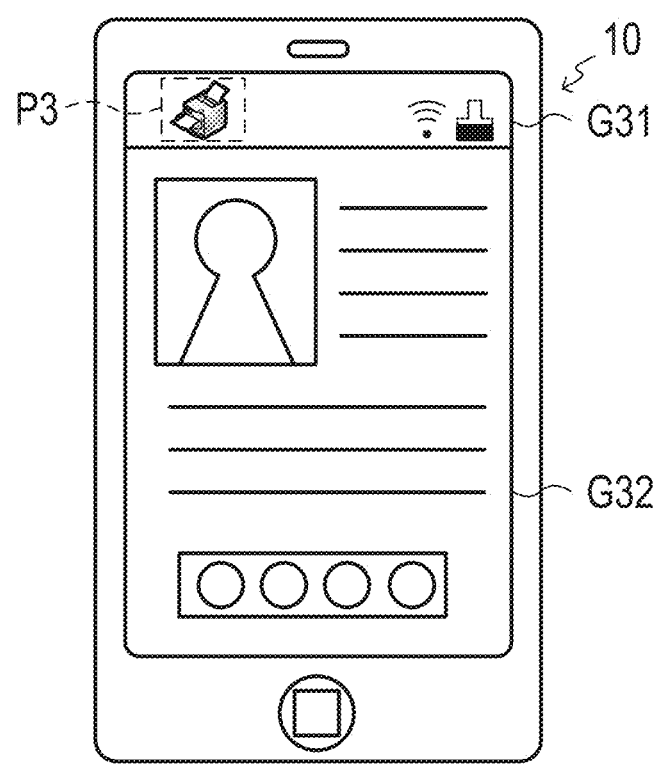
FIG. 7 shows an example of the notification screen and the display screen.

In S400, the print application 21a displays a notification image P3 on the panel 18. Contents of the notification image P3 are similar to the contents of the aforementioned notification image P2. FIG. 7 shows examples of the notification screen G31 and the display screen G32 displayed on the panel 18 in S400. The display screen G32 is a screen displayed by the other application that is not the print application 21a. The notification screen G31 includes an icon of a notification image P3. The icon of the notification image P3 is an image that is smaller than the pop-up notification image P2. When a tap operation is inputted to the notification image P3, a window image for notifying the user that the print data queued in the print data storage area 23 is going to be sent to the printer 110 may additionally be displayed.

In S410, the print application 21a determines whether or not the cell phone 10 is located within a communication range of the wireless communication 202. In a case where an affirmative determination is made (S410: YES), the process proceeds to S420. In S420, the print application 21a sends the print data queued in the print data storage area 23 and the push notification ID to the printer 110.

On the other hand, in a case where a negative determination is made in S410 (S410: NO), the process proceeds to S430. In S430, the print application 21a displays a notification image P4 on the panel 18. The notification image P4 is an image for notifying the user that the print data queued in the print data storage area 23 will be sent to the printer 100 when the communication between the cell phone 10 and the printer 110 is re-established. The notification image P4 may be displayed in a pop-up as aforementioned, or may be displayed in an icon.

In S440, the print application 21a determines whether or not the cell phone 10 entered within the communication range of the wireless communication 202. In a case where a negative determination is made (S440: NO), the process proceeds to S440, in a case where an affirmative determination is made (S440: YES), the process proceeds to S445.

In S445, the print application 21a sends the print data queued in the print data storage area 23 and the push notification ID to the printer 110.

When the print data and the push notification ID are received in S420 or S445, the CPU 132 of the printer 110 controls the print execution unit 120 to execute second print processing in S450. The second print processing is a process executed using the print data sent in S420 or S445.

In S460, the CPU 132 determines whether or not the second print processing is completed. In a case where a negative determination is made (S460: NO), the process returns to S460, and in a case where an affirmative determination is made (S460: YES), the process proceeds to S470. In S470, the CPU 132 sends the print completion notifying information and the push notification ID received in S420 or S445 to the push notification server 100.

When the print completion notifying information is received, the push notification server 100 generates push notification information in S475. The push notification information has been described in S330, thus the explanation thereof will be omitted herein. In S480, the push notification server 100 sends the generated push notification information to an external device identified by the push notification ID received in S420 or S445. Due to this, the push notification information is sent to the cell phone 10.

In S490, the print application 21a displays an image indicating that the second print processing is completed on the panel 18. The image may be displayed in a pop-up as aforementioned, or may be displayed in an icon. Then, the flow is terminated.

Effects of First Embodiment

A case will be assumed in which print data is sent to the printer 110 using the print application 21a being executed in the cell phone 10, and a print processing is executed in the printer 110. At this occasion, there is a case where the printer 110 must queue print data other than the print data currently being subjected to the print processing in the memory 12 of the cell phone 10. In this case, the queued print data needs to be sent to the printer 100 when the print processing in the printer 110 is completed. Due to this, the completion of the print processing in the printer 110 needs to be detected on the cell phone 10 side. However, in order to detect the print completion of the printer 110 on the cell phone 10 side, the print application 21a needs to be maintained in the active state. In other words, the screen of the print application 21a needs to be kept displayed on the foreground. In so doing, other applications (such as the browser application 21b) cannot be displayed on the foreground and be used until the print completion of the printer 110 is detected in the print application 21a. That is, the cell phone 10 would be restricted from executing other applications until the print processing using the print application 21a is completed. Since the cell phone 10 is on the premise of being used while switching among a plurality of applications, an operability of the cell phone 10 is thereby failed to a great extent.

According to the technique described herein, the cell phone 10 can identify the print completion in the printer 110 by the push notification information sent from the push notification server 100 (S340). The push notification information is information that can be received even in a state where the print application 21a is not activated. Thus, the screen of the print application 21a does not need to be kept displayed on the foreground so that the print completion of the printer 110 can be detected. Due to this, there is no restriction on the execution of the other applications in the cell phone 10, so the situation where the operability of the cell phone 10 is failed can be prevented.

According to the technique described herein, the fact that the error occurred during the execution of the print processing in the printer 110 (S260: YES) can be notified to the cell phone 10 using the push notification information. Then, the notification image P1 indicating that the error occurred in the print processing can be displayed on the panel 18 (S360). Due to this, even under a state where the print application 21a is not activated, the fact that the error occurred during the execution of the print processing in the printer 110 can be notified to the user of the cell phone 10.

According to the technique described herein, in a case where the input of the second print instruction is received (S300: YES) during a period from when the print application 21a sent the print data to the printer 110 (S180) until when it receives the push notification information from the push notification server 100 (S340), the print data of which printing was instructed by the second print instruction can be queued in the cell phone 10 (S310). Due to this, even in cases where inputs of a plurality of print instructions are successively received by the print application 21a, those print instructions can surely be executed by the printer 110.

According to the technique described herein, the print data can be divided (S240) in a case where a total capacity of the print data for which printing was instructed by the first print instruction is greater than a storage capacity available in the print data storage area 135 of the printer 110 (S190: NO). Further, the divided print data can be queued in the cell phone 10 (S240), and the divided print data may be sent after an available capacity is secured within the print data storage area 135 (S420). Even in the case where the total capacity of the print data is large, the printing can surely be executed in the printer 110.

According to the technique described herein, in sending the print data queued in the cell phone 10 to the printer 110, in a case where the screen of the print application 21a is displayed in the foreground (S380: YES), the pop-up notification image P2 can be displayed (S390). Due to this, the user can surely be notified that the queued print data is sent to the printer 110. Further, in a case where the screen of the print application 21a is hidden in the background (S380: NO), the icon of the notification image P3 can be displayed (S400). Due to this, even in the event where the user is operating another application, the display of the notification image P3 does not interfere with the user's operation. As above, a suitable notification mode can be selected according to whether or not the print application 21a is in the active state.

Second Embodiment

The second embodiment is an embodiment that uses the same communication system 1 as the first embodiment. Further, in the second embodiment, an embodiment in which the communication between the cell phone 10 and the printer 110 is performed through an NFC communication 200 and a WFD communication 203.

An operation of the communication system 1 of the second embodiment will be described with reference to sequence diagrams of FIGS. 8 to 11. The steps included in FIGS. 2 to 4 and steps included in FIGS. 8 to 11 have the same contents regarding the steps with the same reference signs, unless otherwise mentioned. Thus, the explanation thereof may be omitted. Further, hereinbelow, steps unique to the second embodiment will primarily be explained. Notably, reference signs of the steps unique to the second embodiment will have "a" appended as the last letter thereof. Further, a case where the flow of FIG. 8 is started when the power of the wireless LAN_I/F 118 of the printer 110 is "OFF" will be explained.

Figure 2:
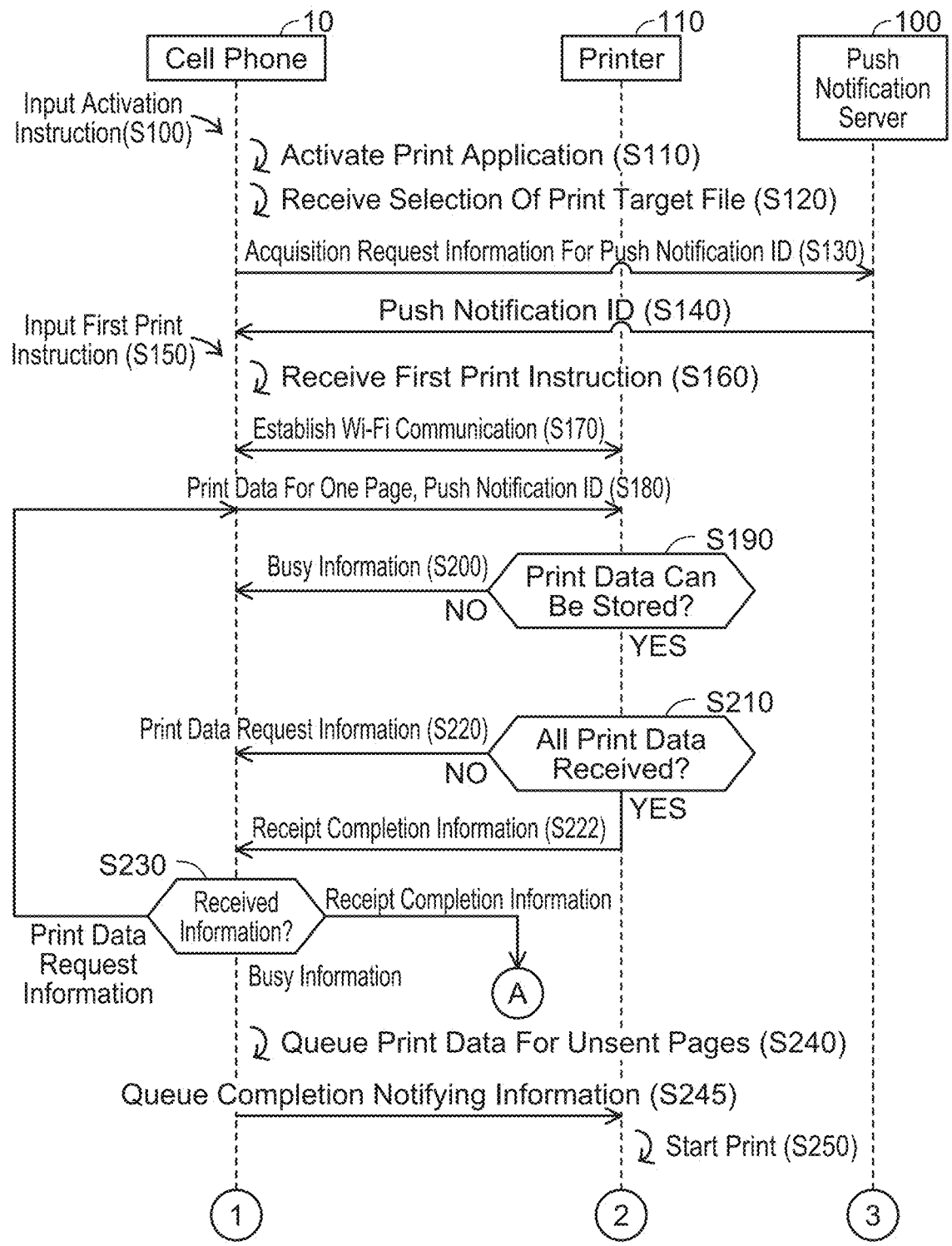
FIG. 2 shows a sequence diagram of the communication system of a first embodiment.
Figure 8:
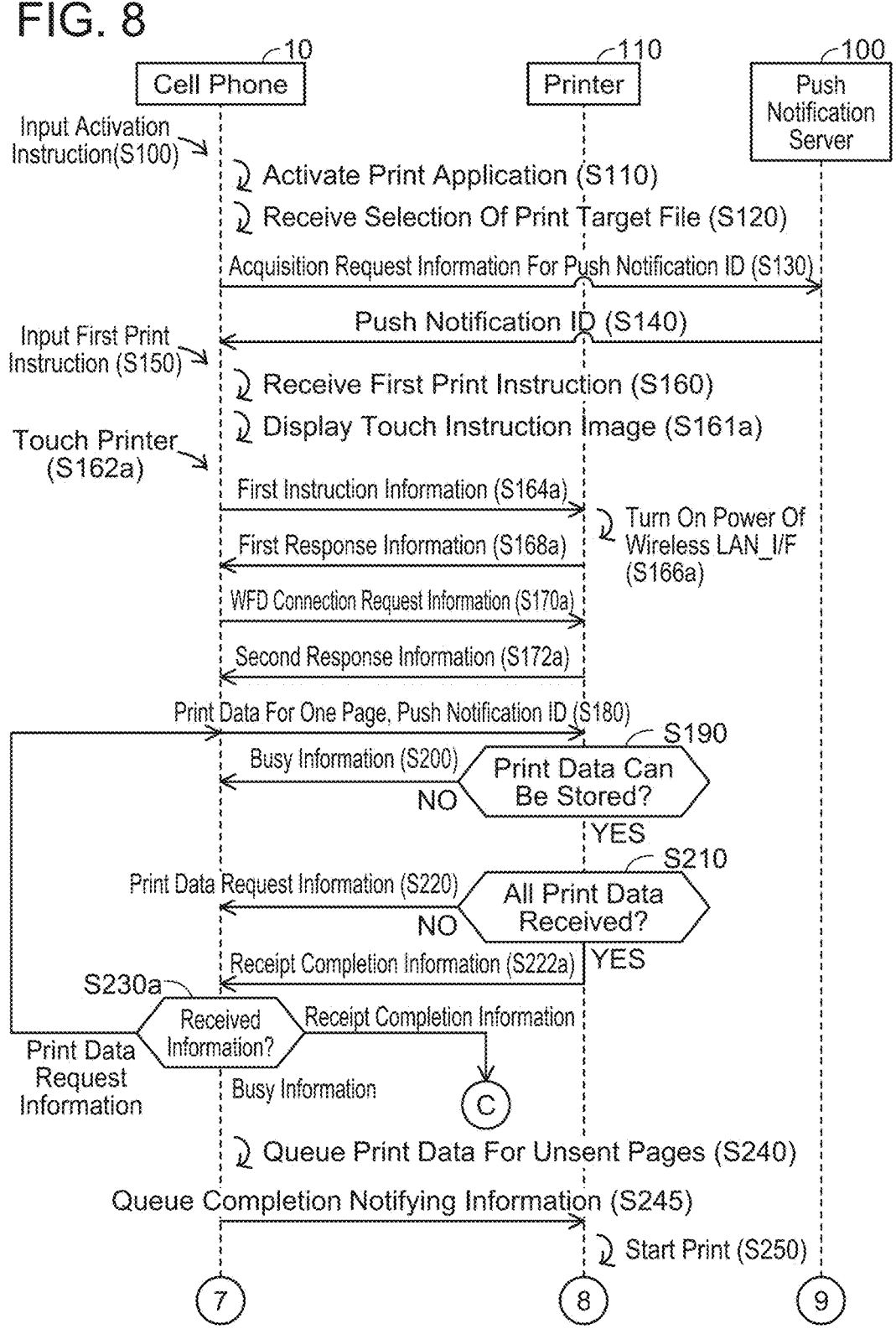
FIG. 8 shows a sequence diagram of a communication system of a second embodiment.

Contents of S100 to S160 of FIG. 8 are the same as the contents of S100 to S160 of FIG. 2, thus the explanation will be omitted. In S161a, the print application 21a displays the image for instructing the user to bring the cell phone 10 closer to the printer 110 on the panel 18. For example, a character string such as "Please touch the printer with your device" may be displayed. In S162a, the user touches the printer 110 with the cell phone 10. Due to this, the NFC communication 200 is established.

In S164a, the print application 21a sends first instruction information to the printer 110 through the NFC communication 200. The first instruction information is information for instructing the printer 110 to turn the power of the wireless LAN_I/F 118 to "ON" so that the WFD communication 203 according to a WFD standards can be executed.

When the first instruction information is received, the CPU 132 of the printer 110 turns the power of the wireless LAN_I/F 118 to "ON" (S166a). In S168a, the CPU 132 sends first response information to the cell phone 10 through the NFC communication 200. The first response information is information for notifying the cell phone 10 that the power of the wireless LAN_I/F 118 was changed to "ON".

In S170a, the print application 21a sends a WFD connection request information to the printer 110 through the WFD communication 203. The WFD connection request information is information for instructing the printer 110 to establish the WFD communication between the cell phone 10 and the printer 110. In S172a, the CPU 132 sends second response information to the cell phone 10 through the WFD communication 203. The second response information is information for notifying the cell phone 10 that the WFD communication 203 can be executed between the cell phone 10 and the printer 110. Hereafter, the various types of data and information are sent and received between the cell phone 10 and the printer 110 using the WFD communication 203 executed between the wireless LAN_I/F 16 and the wireless LAN_I/F 118, unless otherwise mentioned.

Contents of S180 to S220 of FIG. 8 are the same as the contents of S180 to S220 of FIG. 2, thus the explanation will be omitted. In S210, in a case where the CPU 132 of the printer 110 determines that all of print data for N pages included in the print target file have been received (S210: YES), the process proceeds to S222a. In S222a, the CPU 132 sends receipt completion information to the cell phone 10. The receipt completion information is information for notifying the cell phone 10 that all of print data for N pages have been received.

In S230a, the print application 21a determines the information that the printer 110 had replied. In a case where the replied information is the receipt completion information (S230: receipt completion information), the process proceeds to S255a.

In S255a, the print application 21a sends WFD disconnection request information to the printer 110 through the WFD communication 203. The WFD disconnection request information is information for instructing the printer 110 to turn the power of the wireless LAN_I/F 118 to "OFF".

In S257a, the CPU 132 sends third response information to the cell phone 10 through the WFD communication 203. The third response information is ACK information for the WFD disconnection request information. In S258a, the CPU 132 turns the power of the wireless LAN_I/F 118 to "OFF".

Figure 3:
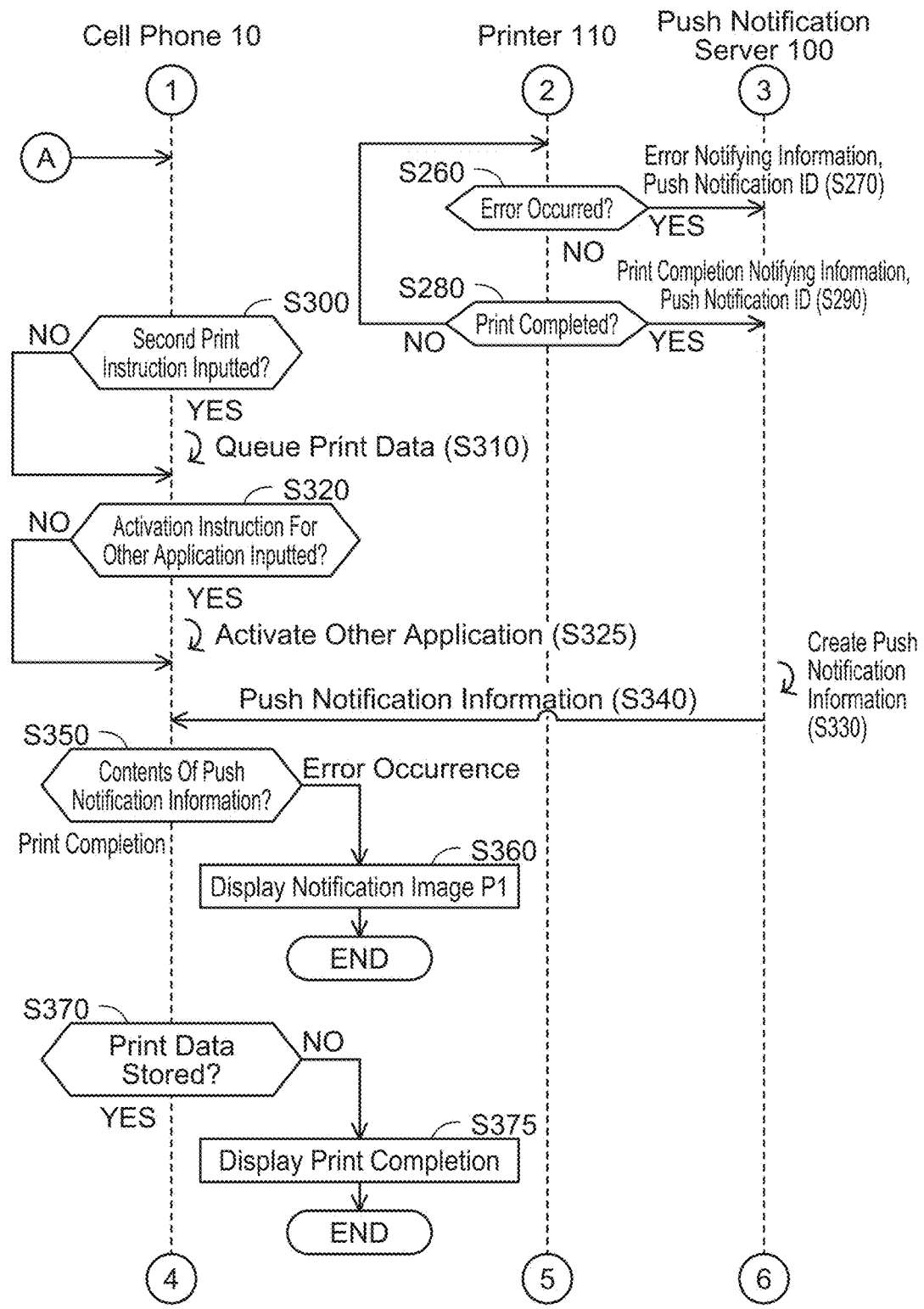
FIG. 3 shows a sequence diagram of the communication system of the first embodiment.
Figure 9:
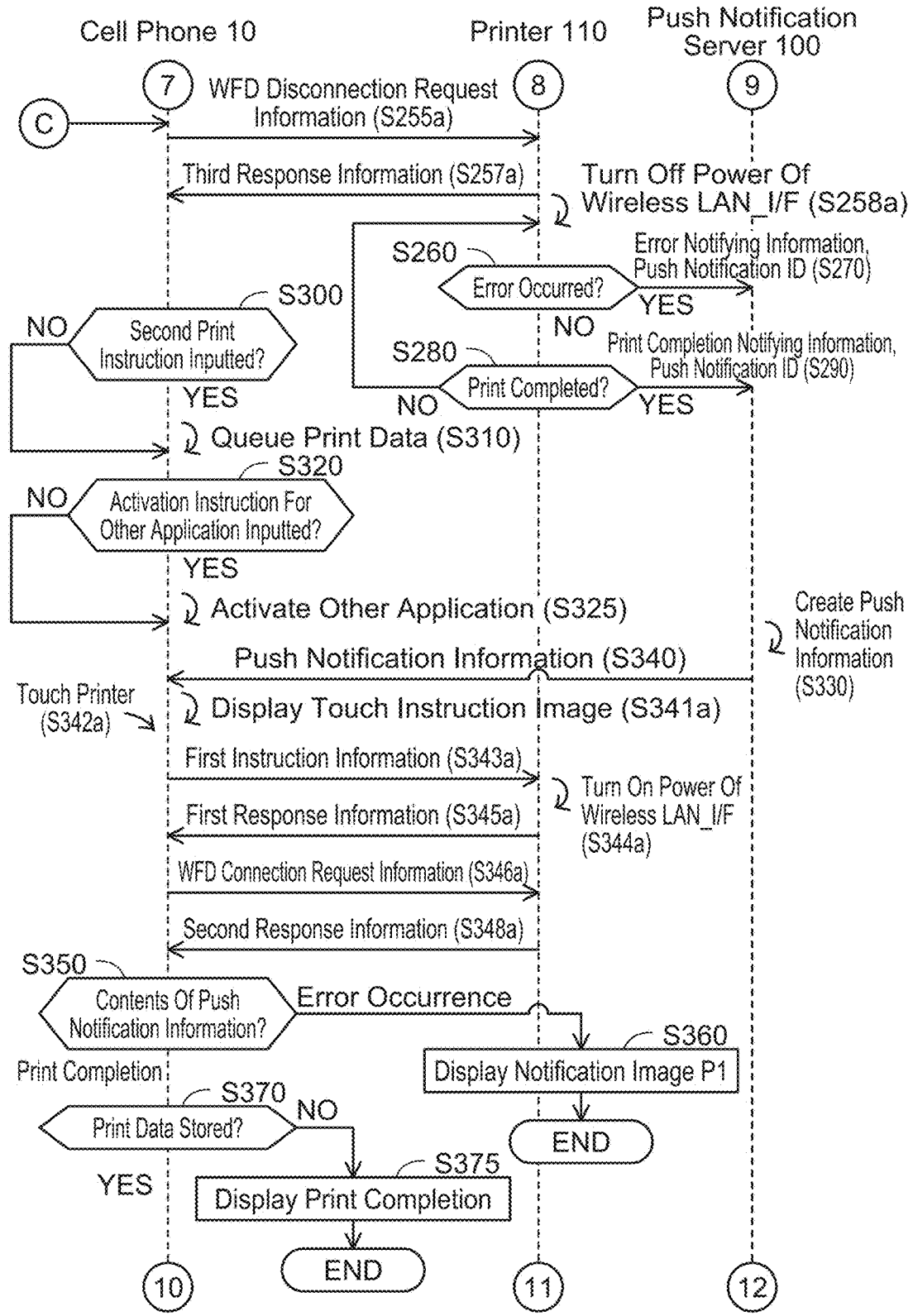
FIG. 9 shows a sequence diagram of the communication system of the second embodiment.

Contents of S260 to S340 of FIG. 9 are the same as the contents of S260 to S340 of FIG. 3, thus the explanation will be omitted. In S341a, the print application 21a displays an image for instructing the user to bring the cell phone 10 closer to the printer 110 on the panel 18. In S342a, the user touches the printer 110 with the cell phone 10. Due to this, the NFC communication 200 is established.

Figure 10:
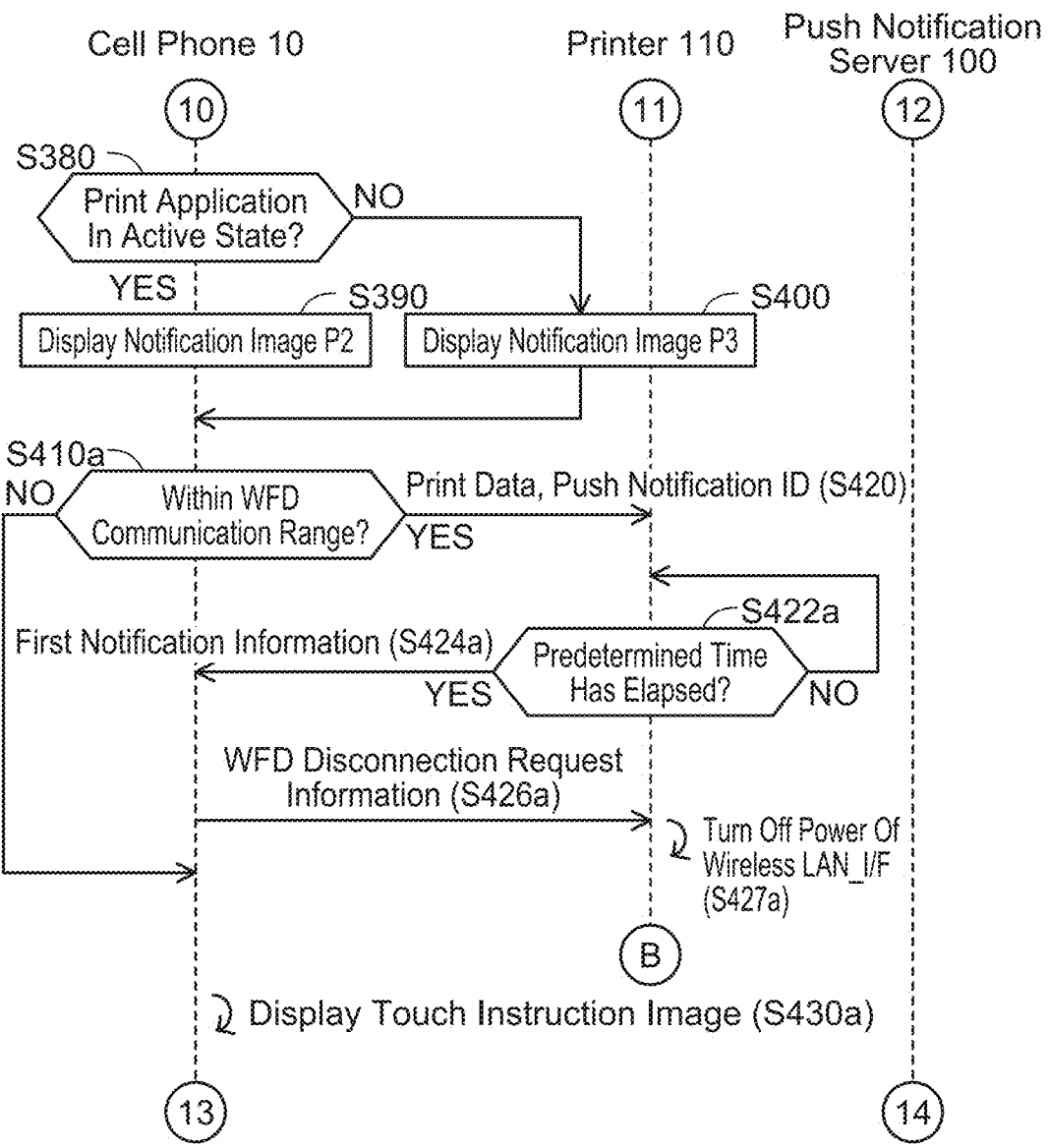
FIG. 10 shows a sequence diagram of the communication system of the second embodiment.

Contents of respective five steps of S343a to S348a of FIG. 9 are the same as the contents of respective five steps of S164a to S172a of FIG. 8, thus the explanation will be omitted. Further, contents of S350 of FIG. 9 to S400 of FIG. 10 are the same as the contents of S350 of FIG. 3 to S400 of FIG. 4, thus the explanation will be omitted.

In S410a, the print application 21a determines whether or not the cell phone 10 is located within a communication range of the WFD communication 203. In a case where an affirmative determination is made (S410a: YES), the process proceeds to S420. In S420, the print application 21a sends the print data queued in the print data storage area 23 and the push notification ID to the printer 110 through the WFD communication 203.

In S422a, the CPU 132 of the printer 110 determines whether or not a predetermined time has elapsed since when the power of the wireless LAN_I/F 118 to "ON" in S344a. The predetermined time may be set to a time that would be sufficiently enough for the sending of the print data from the cell phone 10 to the printer 110 (S420) to be completed. The predetermined time may for example be 30 seconds. In a case where a negative determination is made (S422a: NO), the process returns to S422a, and in a case where an affirmative determination is made (S422a: YES), the process proceeds to S424a.

In S424a, the CPU 132 sends first notifying information to the cell phone 10. The first notifying information is information for notifying the cell phone 10 that the predetermined time has elapsed.

In S426a, the print application 21a sends WFD disconnection request information to the printer 110 through the WFD communication 203. Since the WFD disconnection request information has already been explained in S255a, the explanation will be omitted herein. In S427a, the CPU 132 turns the power of the wireless LAN_I/F 118 to "OFF". Then, the process proceeds to S450.

On the other hand, in a case where a negative determination is made in S410a (S410a: NO), the process proceeds to S430a. In S430a, the print application 21a displays an image for instructing the user to bring the cell phone 10 closer to the printer 110 on the panel 18.

Contents of respective six steps of S440a to S445a of FIG. 11 are the same as the contents of respective six steps of S342a to S348a of FIG. 9, thus the explanation will be omitted.

In S447a, the print application 21a sends the print data queued in the print data storage area 23 and the push notification ID to the printer 110 through the WFD communication 203. In S448a, the print application 21a sends the WFD disconnection request information to the printer 110 through the WFD communication 203. In S449a, the CPU 132 turns the power of the wireless LAN_I/F 118 to "OFF". Contents of S450 to S490 of FIG. 11 are the same as the contents of S450 to S490 of FIG. 4, thus the explanation will be omitted.

Effects of Second Embodiment

According to the technique described herein, the first instruction information can be sent to the printer 110 through the NFC communication 200 (S164a) by establishing the NFC communication 200 (S162a) after having received the input of the first print instruction (S160 of FIG. 8). Due to this, the power of the wireless LAN_I/F 118 of the printer 110 is turned "ON" (S166a), by which the WFD communication 203 can be established. It becomes possible to send the print data from the cell phone 10 to the printer 110 through the WFD communication 203 (S180). Then, when the sending of the print data is completed (S210: YES), the power of the wireless LAN_I/F 118 can be turned "OFF" (S258a). According to the above, the power of the wireless LAN_I/F 118 can be controlled to be turned "ON" only during the period when the print data communication is to be performed. A greater power saving effect can be realized in the printer 110.

Further, according to the technique described herein, the first instruction information can be sent to the printer 110 through the NFC communication 200 (S343a) by establishing the NFC communication 200 (S342a) after the cell phone 10 received the push notification information (S340 of FIG. 9). Due to this, the WFD communication 203 can be established by turning the power of the wireless LAN_I/F 118 of the printer 110 to "ON" (S344a). The print data can be sent from the cell phone 10 to the printer 110 through the WFD communication 203 (S420 of FIG. 10). Further, the power of the wireless LAN_I/F 118 of the printer 110 to "OFF" (S427a) when the predetermined time has elapsed since when the power of the wireless LAN_I/F 118 was turned to "ON" (S422a: YES). According to the above, the power of the wireless LAN_I/F 118 can be controlled to be turned "ON" only during the period when the print data communication is to be performed. A greater power saving effect can be realized in the printer 110.

Further, according to the technique described herein, the image for instructing the user to bring the cell phone 10 closer to the printer 110 can be displayed (S430a) in a case where the determination is made (S410a: NO) that the cell phone 10 is not located within the communication range of the WFD communication 203 when the print data is queued in the cell phone 10 (S370: YES in FIG. 9). Further, the WFD communication 203 can be established by turning the power of the wireless LAN_I/F 118 of the printer 110 to "ON" (S442a) when the user touches the printer 110 with the cell phone 10 (S440a). Due to this, even in the case where the cell phone 10 was located outside the range of the WFD communication 203, the WFD communication 203 can surely be re-established. Thus, the print data queued in the cell phone 10 can surely be sent to the printer 110 (S447a).

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

Modifications

In the present embodiment, a case where the communication between the cell phone 10 and the push notification server 100 is performed by the wireless LAN_I/F 16 has been described, however, no limitation is made hereto. The communication between the cell phone 10 and the push notification server 100 may be performed by the wireless communication 210 executed by the cell phone interface 22 and the Internet 70.

In S180, all of print data for N pages may be sent by one sending session. In this case, in S190, a determination may be made on up to which page can be stored among the received print data for N pages. Further, in S200, a 'Busy' information notifying that only up to M pages can be stored may be sent back to the cell phone 10.

In the first embodiment, the steps of displaying various types of images such as S360, S375, S390, S400, and S490 may be omitted. According to the above, in general terms, the cell phone 10 simply needs to function at least to perform "accepting", "sending first print data", "storing", "receiving", and "sending the second print data". As a specific example thereof, the cell phone 10 simply needs to execute at least S160, S180, S240 or S310, S340, and S420 or S445.

In the second embodiment, the communications of the first response information (S168a, S345a, S443a), the second response information (S172a, S348a, S445a), and the third response information (S257a) may be omitted. Further, S424a and S426a may be omitted. In this case, the printer 110 can turn the power of the wireless LAN_I/F 118 to "OFF" (S427a) when the predetermined time has elapsed (S422a: YES).

The series of processing for establishing the WFD communication 203 in S341a to S348a (FIG. 9) may be performed at any voluntary timing. For example, the processing for S341a to S348a may be executed in a case of determining in S370 of FIG. 9 that the print data is stored in the print data storage area 23 (S370: YES).

In S258a and S449a, the method by which the CPU 132 turns the power of the wireless LAN_I/F 118 to "OFF" may have a variety. For example, the power of the wireless LAN_I/F 118 may be turned to "OFF" when a predetermined time has elapsed since it had been turned to "ON" in S166a or S442a.

The printer 110 and the cell phone 10 may perform a near field wireless communication with other communication technologies (for example, a wireless communication based on a transfer jet technology or an infrared technology and the like) instead of performing the NFC communication 200. Further, the printer 110 and the cell phone 10 may perform a wired communication instead of performing the wireless communication. In general terms, the cell phone 10 and the printer 110 simply need to be capable of communicating with each other.

In a case where the cell phone 10 is in a wired connection to the Internet 70, the communication with the push notification server 100 may be performed by the wired communication. In general terms, the cell phone 10 and the push notification server 100 simply need to be capable of communicating with each other.

In a case where the printer 110 is in a wired connection to the Internet, communication with the push notification server 100 for various types of information may be performed by a wired communication. In general terms, the printer 110 and the push notification server 100 simply need to be capable of communicating with each other.

The push notification server 100 does not need to be a single server, and it may be a plurality of servers configured separately.

A device on which the print application 21a operates does not have to be a cell phone 10, and it may be a tower-type PC, or other devices (such as TV, etc.).

Figure 4:
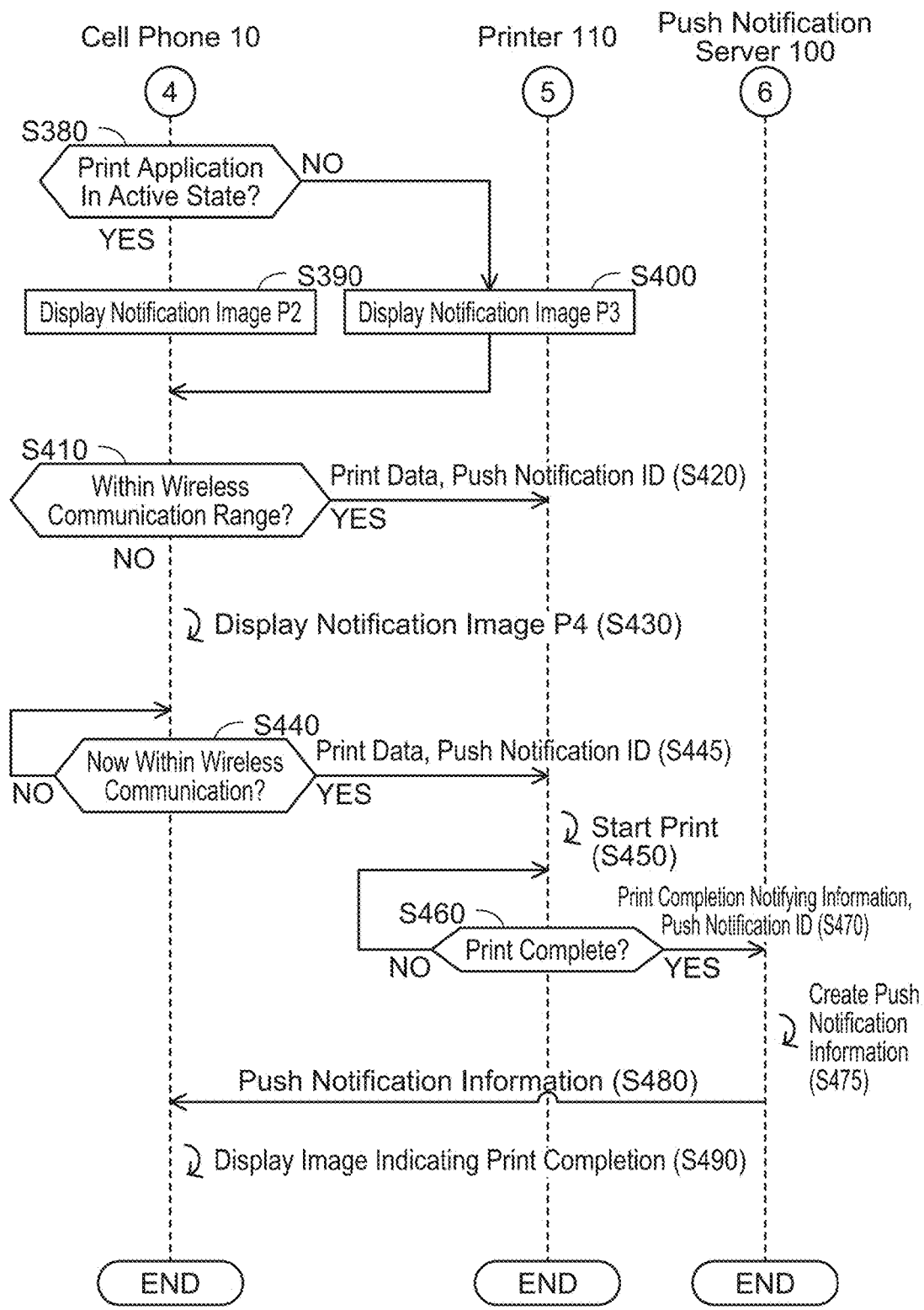
FIG. 4 shows a sequence diagram of the communication system of the first embodiment.

In the respective embodiments as above, the respective processing in FIGS. 2 to 4, etc. is realized by the CPU 132 of the printer 110 and the CPU 11 of the cell phone 10 executing programs in the memories 134 and 12. Instead of this, at least one of the processing among those in FIGS. 2 to 4 may be realized by a hardware, such as a logical circuit.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

The cell phone 10 is an example of an information processing device. The print application 21a is an example of a program. The NFC interface 15, the wireless LAN interface 16 and the cell phone interface 22 are examples of a communication interface. The CPU executing S160 is an example of "accepting an input of a first print instruction". The CPU executing S180 is an example of "sending first print data". The CPU executing S240 or S310 is an example of "storing". The CPU executing S340 is an example of "receiving". The error notifying information and the print completion notifying information are examples of first information. The CPU executing S420 or S445 is an example of "sending". The CPU executing S350 is an example of "determining the first information". The CPU executing S360 is an example of "displaying an image". The notification image P1 is an example of an image indicating that an error has occurred in a first print processing. The CPU executing S300 is an example of "accepting an input of a second print instruction". The CPU executing S200 or S220 is an example of "receiving response information". The CPU executing S230 is an example of "determining the received response information". The CPU executing S370 is an example of "determining whether or not the second print data is stored". The CPU executing S390, S400 is an example of "displaying a specific image". The pop-up is an example of a first manner. The icon is an example of a second manner. The access point 62 is an example of a relay device. The WFD communication 203 is an example of a first wireless communication. The wireless LAN interface 16 is an example of a first communication interface. The CPU executing S170a is an example of "first-establishing".

The CPU executing S255a is an example of "first-disconnecting". The CPU executing S346a is an example of "second-establishing". The CPU executing S426a is an example of "second-disconnecting". The NFC communication 200 is an example of a near field wireless communication. The NFC interface 15 is an example of a second communication interface. The CPU executing S164a is an example of "sending instruction information". The CPU executing S410a is an example of "determining whether or not the information processing device is within a communication range". The CPU executing S430a is an example of "displaying a first image". The CPU executing S441a is an example of "sending the instruction information". The CPU executing S444a is an example of "third-establishing".

What is claimed is:

1. A non-transitory computer-readable recording medium storing computer-readable instructions for an information processing device that comprises a memory and a communication interface configured to communicate with a push notification server and a printer, the computer-readable instructions, when executed by a controller of the information processing device, causing the information processing device to perform:

accepting an input of a first print instruction;

sending first print data to the printer through the communication interface in response to accepting the input of the first print instruction;

storing second print data in the memory in a print stand-by state;

receiving a push notification from the push notification server, the push notification including first information that is related to first print processing using the first print data and outputted from the printer;

determining whether or not the second print data is stored in the memory in response to receiving the first information;

displaying a specific image in a first manner on a display of the information processing device, in a case where the computer-readable instructions are being executed with priority over other computer-readable instructions under a situation where it is determined that the second print data is stored in the memory, the specific image indicating that the second print data is to be sent to the printer;

displaying the specific image in a second manner on the display, in a case where the computer-readable instructions are not being executed with priority over other computer-readable instructions under the situation where it is determined that the second print data is stored in the memory, the specific image displayed in the first manner being larger than the specific image displayed in the second manner; and sending the second print data, which had been stored in the storing, to the printer through the communication interface in response to determining that the second print data is stored in the memory.

2. The non-transitory computer-readable recording medium according to claim 1, wherein the computer-readable instructions, when executed by the controller of the information processing device, further cause the information processing device to perform:

determining the first information received, wherein the sending of the second print data including sending the second print data to the printer when it is determined in the determining that the first information indicates completion of the first print processing.

3. The non-transitory computer-readable recording medium according to claim 2, wherein the computer-readable instructions, when executed by the controller of the information processing device, further cause the information processing device to perform:
displaying an image on a display of the information processing device when it is determined in the determining that the first information indicates an occurrence of an error in the first print processing, the image indicating that the error occurred in the first print processing.

4. The non-transitory computer-readable recording medium according to claim 1, wherein the computer-readable instructions, when executed by the controller of the information processing device, further cause the information processing device to perform:
accepting an input of a second print instruction,
wherein the storing of the second print data includes storing the second print data in the memory in a case where the input of the second print instruction is accepted within a period of time from when the first print data is sent to the printer and until when the push notification including the first information is received from the push notification server.

5. The non-transitory computer-readable recording medium according to claim 1, wherein the computer-readable instructions, when executed by the controller of the information processing device, further cause the information processing device to perform:
receiving response information from the printer in response to sending the first print data to the printer; and
determining the received response information,
wherein the storing of the second print data includes storing a part of the first print data as the second print data in the memory when it is determined that the response information indicates that a size of the first print data is larger than a storage capacity that is available in the printer.

6. A non-transitory computer-readable recording medium storing computer-readable instructions for an information processing device that comprises a memory and a communication interface configured to communicate with a push notification server and a printer, the communication interface including a first communication interface that is configured to perform a first wireless communication directly with the printer without using a relay device, the computer-readable instructions, when executed by a controller of the information processing device, causing the information processing device to perform:
accepting an input of a first print instruction;
first-establishing the first wireless communication in response to accepting the input of the first print instruction;
sending first print data to the printer through the first wireless communication in response to accepting the input of the first print instruction;
receiving completion information indicating that the first print data has been sent to the printer through the first wireless communication;
first-disconnecting the first wireless communication that was established in the first-establishing in response to receiving the completion information;
storing second print data in the memory in a print stand-by state;
receiving a push notification from the push notification server, the push notification including first information that is related to first print processing using the first print data and outputted from the printer;
second-establishing the first wireless communication when the first information is received;
sending the second print data, which had been stored in the storing, to the printer through the first wireless communication that was established in the second-establishing in response to receiving the first information; and
second-disconnecting the first wireless communication that was established in the second-establishing,
the second-disconnecting being performed in response to when a predetermined time has elapsed since when the first wireless communication was established in the second-establishing.

7. The non-transitory computer-readable recording medium according to claim 6, wherein the computer-readable instructions, when executed by the controller of the information processing device, further cause the information processing device to perform:
determining the first information received,
wherein the sending of the second print data includes sending the second print data to the printer when it is determined in the determining that the first information indicates completion of the first print processing.

8. The non-transitory computer-readable recording medium according to claim 7, wherein the computer-readable instructions, when executed by the controller of the information processing device, further cause the information processing device to perform:
displaying an image on a display of the information processing device when it is determined in the determining that the first information indicates an occurrence of an error in the first print processing, the image indicating that the error occurred in the first print processing.

9. The non-transitory computer-readable recording medium according to claim 6, wherein the computer-readable instructions, when executed by the controller of the information processing device, further cause the information processing device to perform:
accepting an input of a second print instruction, and
the storing of the second print data includes storing the second print data in the memory in a case where the input of the second print instruction is accepted within a period of time from when the first print data is sent to the printer and until when the push notification including the first information is received from the push notification server.

10. The non-transitory computer-readable recording medium according to claim 6, wherein the computer-readable instructions, when executed by the controller of the information processing device, further cause the information processing device to perform:
receiving response information from the printer in response to sending the first print data to the printer; and
determining the received response information,
wherein the storing of the second print data includes storing a part of the first print data as the second print data in the memory when it is determined that the response information indicates that a size of the first print data is larger than a storage capacity that is available in the printer.

11. The non-transitory computer-readable recording medium according to claim 6, wherein the communication interface includes a second communication interface that is configured to start a near field wireless communication when the information processing device is brought within a predetermined distance from the printer, the computer-readable instructions, when executed by the controller of the information processing device, further cause the information processing device to perform:

sending instruction information to the printer using the near field wireless communication when the information processing device is brought within the predetermined distance from the printer after the input of the first print instruction is accepted, wherein the instruction information is information for instructing the printer to execute processing for performing the first wireless communication, and wherein the first-establishing includes establishing the first wireless communication after the instruction information is sent.

12. The non-transitory computer-readable recording medium according to claim 11, wherein the computer-readable instructions, when executed by the controller of the information processing device, further cause the information processing device to perform:

determining whether or not the information processing device is within a communication range of the first wireless communication in response to receiving the first information;

displaying a first image on a display of the information processing device when it is determined that the information processing device is not within the communication range of the first wireless communication, the first image instructing a user to bring the information processing device within the predetermined distance from the printer;

sending the instruction information to the printer using the near field wireless communication in response to when the information processing device is brought within the predetermined distance from the printer after the first image is displayed; and third-establishing the first wireless communication after the instruction information is sent, wherein the sending of the second print data includes sending the second print data to the printer through the established first wireless communication that was established in the third-establishing.

13. An information processing device comprising:
a memory storing computer-readable instructions;
a communication interface configured to communicate with a push notification server and a printer; and
a controller,
wherein the computer-readable instructions, when executed by the controller, cause the information processing device to perform:
accepting an input of a first print instruction;
sending first print data to the printer through the communication interface in response to accepting the input of the first print instruction;
storing second print data in the memory in a print stand-by state;
receiving a push notification from the push notification server, the push notification including first information that is related to first print processing using the first print data and outputted from the printer;
determining whether or not the second print data is stored in the memory in response to receiving the first information;
displaying a specific image in a first manner on a display of the information processing device, in a case where the computer-readable instructions are being executed with priority over other computer-readable instructions under a situation where it is determined that the second print data is stored in the memory, the specific image indicating that the second print data is to be sent to the printer;
displaying the specific image in a second manner on the display, in a case where the computer-readable instructions are not being executed with priority over other computer-readable instructions under the situation where it is determined that the second print data is stored in the memory, the specific image displayed in the first manner being larger than the specific image displayed in the second manner; and
sending the second print data, which had been stored in the storing, to the printer through the communication interface in response to determining that the second print data is stored in the memory.

14. The information processing device according to claim 13, wherein the computer-readable instructions, when executed by the controller of the information processing device, further cause the information processing device to perform:
determining the first information received,
wherein the sending of the second print data includes sending the second print data to the printer when it is determined in the determining that the first information indicates completion of the first print processing.

15. The information processing device according to claim 14, wherein the computer-readable instructions, when executed by the controller of the information processing device, further cause the information processing device to perform:
displaying an image on a display of the information processing device when it is determined in the determining that the first information indicates an occurrence of an error in the first print processing, the image indicating that the error occurred in the first print processing.

16. An information processing device comprising:
a memory storing computer-readable instructions;
a communication interface configured to communicate with a push notification server and a printer, and including a first communication interface that is configured to perform a first wireless communication directly with the printer without using a relay device; and
a controller,
wherein the computer-readable instructions, when executed by the controller, cause the information processing device to perform:
accepting an input of a first print instruction;
first-establishing the first wireless communication in response to accepting the input of the first print instruction;
sending first print data to the printer through the first wireless communication in response to accepting the input of the first print instruction;
receiving completion information indicating that the first print data has been sent to the printer through the first wireless communication;
first-disconnecting the first wireless communication that was established in the first-establishing in response to receiving the completion information;
storing second print data in the memory in a print stand-by state;

receiving a push notification from the push notification server, the push notification including first information that is related to first print processing using the first print data and outputted from the printer;

second-establishing the first wireless communication when the first information is received;

sending the second print data, which had been stored in the storing, to the printer through the first wireless communication that was established in the second-establishing in response to receiving the first information; and second-disconnecting the first wireless communication that was established in the second-establishing, the second-disconnecting being performed in response to when a predetermined time has elapsed since the first wireless communication was established in the second-establishing.

17. The information processing device according to claim 16, wherein the computer-readable instructions, when executed by the controller of the information processing device, further cause the information processing device to perform:

determining the first information received, wherein the sending of the second print data includes sending the second print data to the printer when it is determined in the determining that the first information indicates completion of the first print processing.

18. The information processing device according to claim 17, wherein the computer-readable instructions, when executed by the controller of the information processing device, further cause the information processing device to perform:

displaying an image on a display of the information processing device when it is determined in the determining that the first information indicates an occurrence of an error in the first print processing, the image indicating that the error occurred in the first print processing.

19. The information processing device according to claim 16, wherein the communication interface includes a second communication interface that is configured to start a near field wireless communication when the information processing device is brought within a predetermined distance from the printer, the computer-readable instructions, when executed by the controller of the information processing device, further cause the information processing device to perform:

sending instruction information to the printer using the near field wireless communication when the information processing device is brought within the predetermined distance from the printer after the input of the first print instruction is accepted in the accepting, wherein the instruction information is information for instructing the printer to execute processing for performing the first wireless communication, and wherein the first-establishing includes establishing the first wireless communication after the instruction information is sent.

20. The information processing device according to claim 19, wherein the computer-readable instructions, when executed by the controller of the information processing device, further cause the information processing device to perform:

determining whether or not the information processing device is within a communication range of the first wireless communication in response to receiving the first information;

displaying a first image on a display of the information processing device when it is determined that the information processing device is not within the communication range of the first wireless communication, the first image instructing a user to bring the information processing device within the predetermined distance from the printer;

sending the instruction information to the printer using the near field wireless communication in response to when the information processing device is brought within the predetermined distance from the printer after the first image is displayed; and third-establishing the first wireless communication after the instruction information is sent, wherein the sending of the second print data includes sending the second print data to the printer through the first wireless communication that was established in the third-establishing.

\* \* \* \* \*